United States Patent
Zhao et al.

(10) Patent No.: US 10,089,974 B2
(45) Date of Patent: Oct. 2, 2018

(54) SPEECH RECOGNITION AND TEXT-TO-SPEECH LEARNING SYSTEM

(71) Applicant: Microsoft Technology Licensing, LLC, Redmond, WA (US)

(72) Inventors: Pei Zhao, Beijing (CN); Kaisheng Yao, Newcastle, WA (US); Max Leung, Kirkland, WA (US); Bo Yan, Jiangsu (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 15/087,696

(22) Filed: Mar. 31, 2016

(65) Prior Publication Data
US 2017/0287465 A1    Oct. 5, 2017

(51) Int. Cl.
G10L 13/00     (2006.01)
G10L 13/10     (2013.01)
G10L 13/08     (2013.01)
G10L 15/06     (2013.01)

(52) U.S. Cl.
CPC ............ *G10L 13/10* (2013.01); *G10L 13/086* (2013.01); *G10L 15/063* (2013.01)

(58) Field of Classification Search
None
See application file for complete search history.

(56) References Cited

U.S. PATENT DOCUMENTS

| | | | |
|---|---|---|---|
| 5,668,926 A | | 9/1997 | Karaali et al. |
| 6,029,132 A | * | 2/2000 | Kuhn ..................... G10L 13/08 704/258 |
| 6,411,932 B1 | * | 6/2002 | Molnar .................. G09B 19/04 704/254 |
| 6,453,284 B1 | * | 9/2002 | Paschall ................ G10L 21/028 381/94.3 |

(Continued)

OTHER PUBLICATIONS

Catanzaro, Bryan, "Deep Speech: Accurate Speech Recognition with GPU-Accelerated Deep Learning", Published on: Feb. 25, 2015, 6 pages. Available at http://devblogs.nvidia.com/parallelforall/deep-speech-accurate-speech-recognition-gpu-accelerated-deep-learning/.

(Continued)

*Primary Examiner* — Marcus T Riley

(57) ABSTRACT

An example text-to-speech learning system performs a method for generating a pronunciation sequence conversion model. The method includes generating a first pronunciation sequence from a speech input of a training pair and generating a second pronunciation sequence from a text input of the training pair. The method also includes determining a pronunciation sequence difference between the first pronunciation sequence and the second pronunciation sequence; and generating a pronunciation sequence conversion model based on the pronunciation sequence difference. An example speech recognition learning system performs a method for generating a pronunciation sequence conversion model. The method includes extracting an audio signal vector from a speech input and applying an audio signal conversion model (Continued)

to the audio signal vector to generate a converted audio signal vector. The method also includes adapting an acoustic model based on the converted audio signal vector to generate an adapted acoustic model.

19 Claims, 16 Drawing Sheets

(56) References Cited

U.S. PATENT DOCUMENTS

| | | | |
|---|---|---|---|
| 6,973,427 B2* | 12/2005 | Hwang | G10L 15/063 704/10 |
| 7,577,569 B2 | 8/2009 | Roth et al. | |
| 7,590,533 B2* | 9/2009 | Hwang | G10L 15/063 704/231 |
| 7,720,683 B1* | 5/2010 | Vermeulen | G10L 15/22 704/235 |
| 8,060,565 B1 | 11/2011 | Swartz | |
| 9,466,292 B1* | 10/2016 | Lei | G10L 15/16 |
| 2002/0120444 A1 | 8/2002 | Botterweck | |
| 2010/0268535 A1 | 10/2010 | Koshinaka | |
| 2015/0095026 A1* | 4/2015 | Bisani | G10L 15/08 704/232 |
| 2015/0248881 A1 | 9/2015 | Holdren et al. | |
| 2017/0160813 A1* | 6/2017 | Divakaran | G06F 3/017 |
| 2017/0287465 A1* | 10/2017 | Zhao | G10L 13/10 |

OTHER PUBLICATIONS

Fan, et al., "TTS Synthesis with Bidirectional LSTM based Recurrent Neural Networks", In Proceedings of 15th Annual Conference of the International Speech Communication Association, Sep. 14, 2014, pp. 1964-1968.

Sun, et al., "Voice Conversion using Deep Bidirectional Long Short-Term Memory based Recurrent Neural Networks", In Proceedings of 40th IEEE International Conference on Acoustics, Speech and Signal Processing, Apr. 19, 2015, pp. 4869-4873.

Zhang, Yan, "Speech Recognition Using Deep Learning Algorithms", Published on: Jan. 23, 2014, 5 pages. Available at: http://cs229.stanford.edu/proj2013/zhang_Speech%20Recognition%20Using%20Deep%20Learning%20Algorithms.pdf.

Rajput, et al., "Speech Recognition using the Epochwise Back Propagation through time Algorithm", In International Journal of Computer Applications, vol. 95, No. 21, Jun. 2014, pp. 17-21.

Qian, et al., "Deep Learning for Speech Generation and Synthesis", In Proceedings of 9th International Symposium on Chinese Spoken Language Processing, Sep. 12, 2014, 88 pages.

Hyman, Paul, "Speech-to-Speech Translations Stutter, But Researchers See Mellifluous Future", In Journal Communications of the ACM, vol. 57 No. 4, Apr. 2014, pp. 16-19.

Bilcu, Eniko Beatrice, "Text-To-Phoneme Mapping Using Neural Networks", In Doctoral dissertation of Tampere University of Technology, Oct. 22, 2008, 150 pages.

Bisani, et al., "Joint-Sequence Models for Grapheme-To-Phoneme Conversion", In Journal Speech Communication, vol. 50, Issue 5, May 2008, 2 pages.

Dietterich, et al., "A Comparison of ID3 and Backpropagation for English Text-to Speech Mapping", In Journal Machine Learning, vol. 18, No. 1, Jan. 1995, pp. 51-80.

"Give your Small Business Customers a Big Experience", Retrieved on: Oct. 27, 2015 Available at: http://www.nuance.com/for-business/customer-service-solutions/loquendo-small-business-bundle/index.htm.

PCT International Search Report and Written Opinion in International Application PCT/US2017/024388, dated Sep. 21, 2017, 26 pages.

Fukada et al., "Automatic generation of multiple pronunciations based on neural networks", Speech Communication, Elsevier Science Publishers, Amsterdam, NL, vol . 27, No. 1, Feb. 1, 1999, pp. 63-73.

Helmer Strik, "Pronunciation adaptation at the lexical level", Proceedings of ISCA Tutorial and Research Workshop: Adaption Methods for Speech Recognition, Aug. 1, 2001, pp. 1-10.

Qader Raheel et al., "Probabilistic Speaker Pronunciation Adaptation for Spontaneous Speech Synthesis Using Linguistic Features", Network and Parallel Computing; [Lecture Notes in Computer Science; Springer International Publishing, Nov. 17, 2015, pp. 229-241.

Jong Se Park et al., "Eigenvoice based fast speaker adaptation with bias compensation", Science and Technology, 2003. Proceedings Korus 2003, The 7th Korea-Russia International Symposium on IEEE, Jul. 6, 2003, vol. 2, pp. 108-112.

Pye D, et al. "Experiments in speaker normalisation and adaptation for large vocabulary speech recognition", IEEE International Conference on Acoustics, Speech, and Signal Processing, ICASSP-97, Munich, Germany, Apr. 21-24, 1997, Los Alamitos, CA, USA, IEEE Comput. Soc; US, Apr. 21, 1997, pp. 1047-1050.

* cited by examiner

SPEECH RECOGNITION AND TEXT-TO-SPEECH LEARNING SYSTEM

BACKGROUND

Text-to-speech applications are used to read written text aloud. Such applications may assist people with poor eyesight, people who are engaged in activity where reading the text is undesirable, such as driving a car, and people who may just prefer to hear text read aloud rather than having to read the text. In situations where text is read aloud to the user, the user often wants to hear a voice that sounds more natural and accurately reads the text.

Speech-recognition applications are used to receive spoken commands and input from users. These applications may be useful when a user's hands or eyes are otherwise occupied, such as while driving a car, when a user is interacting with a computing device with a small or limited text input interface, and when a user simply speak rather than type input. Users often desire to speak normally and using ordinary language while interacting with speech-recognition applications.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

An example text-to-speech learning system performs a method for generating a pronunciation sequence conversion model. The method includes generating a first pronunciation sequence from a speech input of a training pair and generating a second pronunciation sequence from a text input of the training pair. The method also includes determining a pronunciation sequence difference between the first pronunciation sequence and the second pronunciation sequence; and generating a pronunciation sequence conversion model based on the pronunciation sequence difference. An example speech recognition learning system performs a method for generating a pronunciation sequence conversion model. The method includes extracting an audio signal vector from a speech input and applying an audio signal conversion model to the audio signal vector to generate a converted audio signal vector. The method also includes adapting an acoustic model based on the converted audio signal vector to generate an adapted acoustic model.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects.

DETAILED DESCRIPTION

Figure 1:
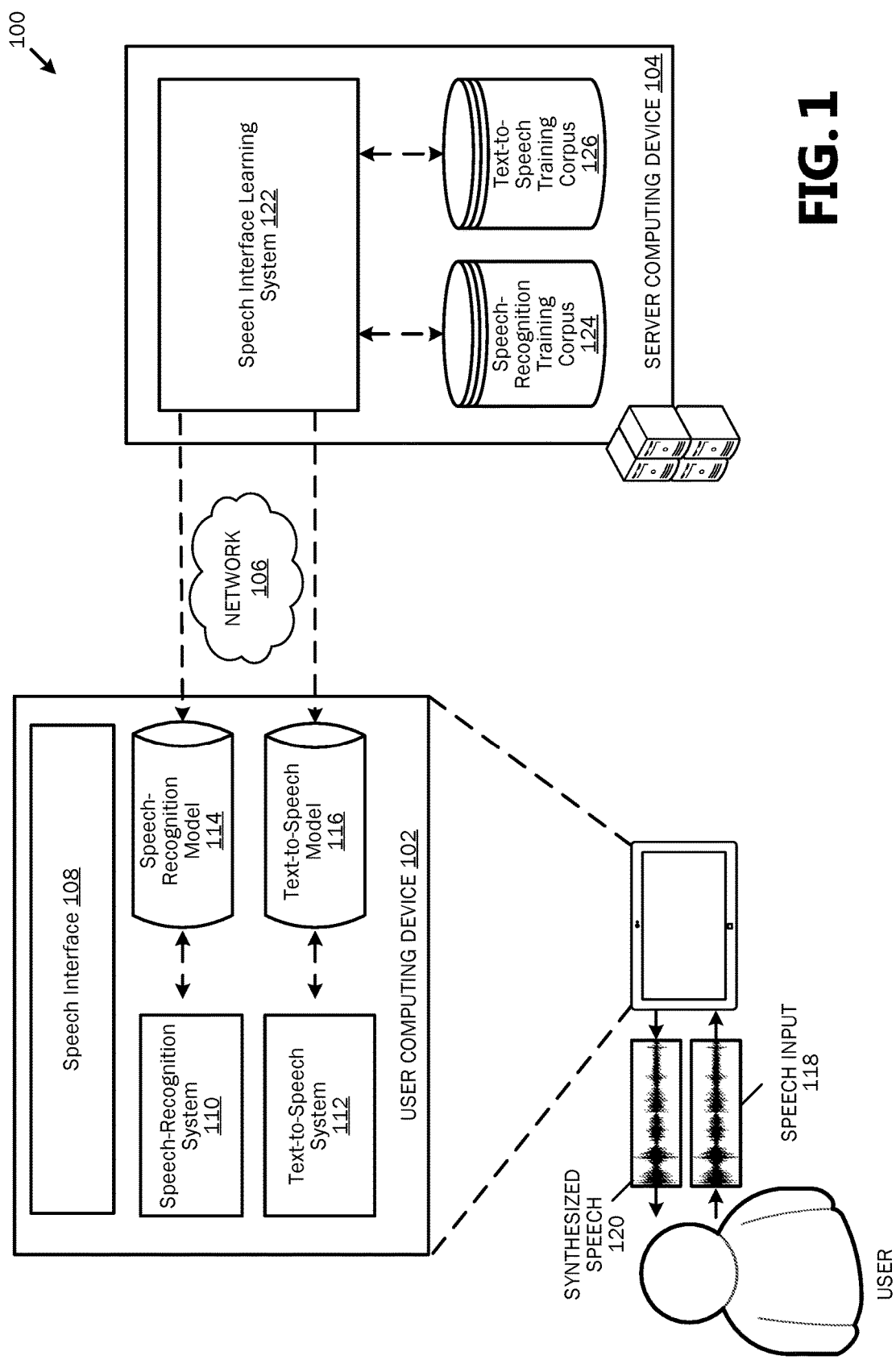
FIG. 1 illustrates an example system for providing a speech interface and performing speech-recognition and text-to-speech learning.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

A computing device may include one or both of a text-to-speech system and a speech-recognition system. For example, the computing device may include a speech interface that combines elements of text-to-speech systems and speech-recognition systems to permit a user to interact with an application using speech input and audio output. For example, a user may interact with the speech interface by speaking to the computing device. The speech-recognition system may convert speech input from the user to one or more words that may be interpreted as commands or other input to the computing device. The text-to-speech system may synthesize speech based on textual data. The textual data may come from many sources. For example, the textual data may be part of the results of a command executed based on the speech input from the user. As another input, the textual input may be generated based on a document that is open or an event that has occurred on or been detected by the computing device. The synthesized speech may be played back to the user as audio output. In this manner, a user may interact with the computing device without using physical controls (e.g., touchscreen, buttons, keyboard, mouse, etc.). However, in other aspects, the text-to-speech system and the speech-recognition system are not part of a speech interface and are separate from one another.

In some aspects, the speech-recognition system uses a speech-recognition model to recognize the words in the speech input. The speech-recognition model may be generated (trained) by a speech interface learning system based on training data. Similarly, the text-to-speech system may use a text-to-speech model to synthesize speech in a manner that is intelligible and sounds similar to human speech. The text-to-speech model may also be generated (trained) by the speech interface learning system based on training data. As an example, the training data may comprise a plurality of training pairs, in which each training pair includes a speech input (e.g., an audio recording of one or more words being spoken) and a corresponding text input (e.g., a transcript of the words spoken in the speech input). In some aspects, the training continues based on at least some of the user-machine speech communication so that one or both of the text-to-speech system and the speech-recognition system continue to improve.

In some aspects, the speech interface learning system uses the same training data to generate both the speech-recognition model and the text-to-speech model. Beneficially, the speech interface learning system can expand the amount of training data available for use in generating the speech-recognition model and the text-to-speech model. Additionally, the speech interface learning system may use the output of one or more components of the speech-recognition system to generate the text-to-speech model. Similarly, the speech interface learning system may use the output of one or more components of the text-to-speech system to generate the speech-recognition model.

In some aspects, the speech recognition system generates an audio signal vector from a speech input by sampling the speech input and then generates a pronunciation sequence for the speech input based on the audio signal vector. The pronunciation sequence may correspond to a symbolic (i.e., non-audio data) representation of the parts of speech represented in the audio signal. For example, a pronunciation sequence may include a sequence of pronunciation signals such as phones, phonemes, pauses, and other types of pronunciation signals.

In some aspects of the speech interface learning system, aspects of the speech-recognition system are used to generate a text-to-speech model. For example, the speech-recognition system may be used to extract a pronunciation sequence from a speech input of a training pair, while the text-to-speech system is used to generate a pronunciation sequence from the text input of the training pair. These two pronunciation sequences can be compared and used, at least in part, to generate a pronunciation sequence conversion model that may be used by the text-to-speech system to synthesize speech based on pronunciation sequences that more closely match the pronunciation sequences extracted from the speech input. Beneficially, by comparing the intermediate pronunciation sequences rather than the final synthesized speech, the speech interface learning system may be able to build better models for use by text-to-speech systems in speech synthesis. For example, this interface learning system may be able to minimize the effect of a speaker's voice on the training process by focusing on the comparison and the conversion model on the pronunciation sequence. Beneficially, the speech interface learning system may be able to use training data collected for speech recognition purposes (e.g., having many different speakers) to train a text-to-speech system.

In some aspects of the speech interface learning system, aspects of the text-to-speech system are used to generate a speech-recognition model. For example, the text-to-speech system may be used to generate an audio signal vector from the text input of a training pair, while the speech recognition system is used to extract an audio signal vector from the speech input of the training pair. These two audio signal vectors can be compared and used, at least in part, to generate an audio signal conversion model that may be used by speech-recognition systems. For example, when used by the speech-recognition system, the audio signal vector conversion model can be used to convert an audio signal vector extracted from a speech input to an audio signal vector that may be more useful in recognizing the speech in the speech input. Beneficially, by comparing the intermediary audio signal vectors to train the speech-recognition model, the speech interface learning system can generate models that may perform better during speech recognition. Additionally, since the model is generated based on the audio signal vectors, large amounts of training data from a single speaker may be used with less risk of overtraining the speech-recognition system to the single speaker's voice.

FIG. 1 illustrates an example system 100 for providing a speech interface and performing speech-recognition and text-to-speech learning. In this example, the system 100 includes a user computing device 102 and a server computing device 104 that communicate over a network 106. The user computing device 102 may be any suitable computing device for implementing a speech interface for user interaction. For example, the user computing device 102 may be at least one of: a mobile telephone; a smart phone; a tablet; a phablet; a smart watch; a wearable computer; a personal computer; a desktop computer; a laptop computer; a gaming device/computer (e.g., the XBOX® gaming system from Microsoft Corporation of Redmond, Wash.); a media playback device (e.g., a BLUERAY® or DVD player, or streaming media player), a television; navigation systems; vehicle telematics systems; etc. This list is exemplary only and should not be considered as limiting.

In some aspects, the user computing device 102 includes a speech interface 108, a speech-recognition system 110, and a text-to-speech system 112. For example, the speech interface 108 provides an interface for the user to interact with the user computing device 102 with spoken language. In some aspects, the speech interface 108 includes an intelligent personal assistant that can perform tasks or services for the user. Non-limiting examples of an intelligent personal assistant include the CORTANA® software and services from Microsoft Corporation of Redmond, Wash., the GOOGLE NOW® software and services from Google Inc. of Mountain View, Calif., and the SIRI® software and services from Apple Inc. of Cupertino, Calif. In other aspects, the speech interface 108 comprises other types of applications or services such as a screen reader or dictation system.

In some aspects, the speech interface 108 uses one or both of the speech-recognition system 110 and a text-to-speech system 112 to interact with the user. Additionally or alternatively, one or both of the speech-recognition system 110 and the text-to-speech system 112 interact with the user independently of the speech interface 108. The speech-recognition system 110 recognizes speech input 118 received from a user as spoken words, which may correspond to commands, input content, and the like. The speech input 118 may be received by the speech-recognition system 110 as an audio signal via, for example, a microphone. In some aspects, the speech-recognition system 110 uses a speech-recognition model 114 to recognize the audio signal of the speech input 118 as a sequence of words. In some aspects, the speech-recognition model 114 includes an audio signal vector conversion model and an acoustic model adaptation model. The text-to-speech system 112 generates synthesized speech 120 for playback to the user via, for example, a speaker. In some aspects, the text-to-speech system 112 uses a text-to-speech model 116 to generate synthesized speech 120. In some aspects, the text-to-speech model 116 includes a pronunciation sequence conversion model.

The server computing device 104 includes a speech interface learning system 122. The speech interface learning system 122 generates the speech-recognition model 114 and the text-to-speech model 116. In some aspects, the speech interface learning system 122 uses a speech-recognition training corpus 124 and a text-to-speech training corpus 126 to generate the speech-recognition model 114 and the text-to-speech model 116. In some aspects, both the speech-recognition training corpus 124 and the text-to-speech training corpus 126 are used to generate the speech-recognition model 114. Similarly, in some aspects, both the speech-recognition training corpus 124 and a text-to-speech training corpus 126 are used to generate the text-to-speech model 116.

Although in the example of FIG. 1, the speech-recognition system 110 and text-to-speech system 112 are both in the user computing device 102, in other aspects, one or both of the speech-recognition system 110 and the text-to-speech system 112 may be on the server computing device. For example, the user computing device 102 may transmit speech input 118 that is received to the server computing device 104 for recognition. In another aspect, at least a portion of the speech interface learning system 122 is on the user computing device 102 and generates or updates one or both of the speech-recognition model 114 and the text-to-speech model 116.

Figure 2:
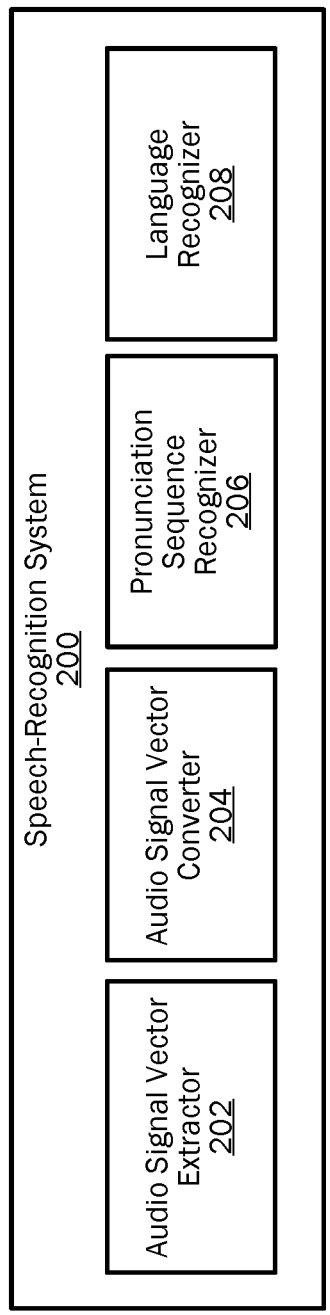
FIG. 2 is a schematic block diagram of an example of the speech-recognition system of FIG. 1.

FIG. 2 is a schematic block diagram of an example speech-recognition system 200. The speech-recognition system 200 is a nonexclusive example of a speech-recognition system, such as the speech-recognition system 110 illustrated in FIG. 1. In this example, the speech-recognition system 200 includes an audio signal vector extractor 202, an audio signal vector converter 204, pronunciation sequence recognizer 206, and a language recognizer 208. The audio signal vector extractor 202 extracts an audio signal vector from a speech input. The audio signal vector converter 204 converts an audio signal vector based on an audio signal vector conversion model. The pronunciation sequence recognizer 206 recognizes a pronunciation sequence based on an audio signal vector. The language recognizer 208 recognizes language in a pronunciation sequence. Examples of these components are described in greater detail with respect to the flow diagram that follows.

Figure 3:
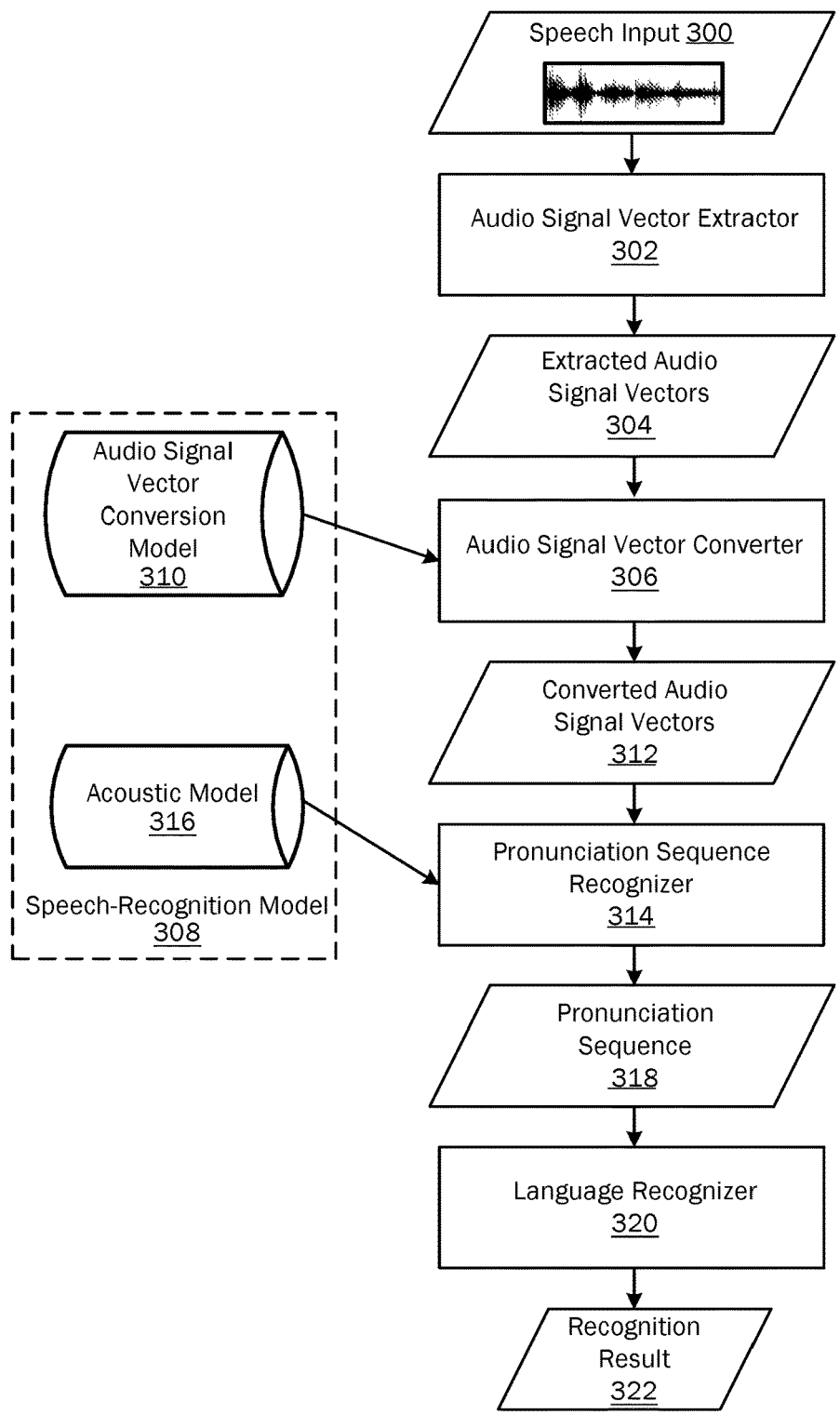
FIG. 3 is an example data flow for the example speech-recognition system of FIG. 2.

FIG. 3 is an example data flow for an example speech-recognition system, such as the speech-recognition system 200 illustrated in FIG. 2. An audio signal vector extractor 302 extracts an audio signal vector 304 from the speech input 300. The audio signal vector extractor 302 is a nonexclusive example of an audio signal vector extractor, such as the audio signal vector extractor 202 illustrated in FIG. 2. For example, the audio signal vector extractor 302 may sample the speech input 300 to generate the extracted audio signal vector 304. In various aspects, various sampling rates are used, such as 8 kHz, 16 kHz, etc. In some aspects, the extracted audio signal vector 304 includes a plurality of values corresponding to the amplitude of the audio signal at various frequencies for each of the samples from the speech input 300.

An audio signal vector converter 306 converts the extracted audio signal vector 304 using an audio signal vector conversion model 310 from a speech-recognition model 308. The audio signal vector converter 306 is a nonexclusive example of an audio signal vector converter, such as the audio signal vector converter 204 illustrated in FIG. 2. The speech-recognition model 308 is a nonexclusive example of a speech-recognition model, such as the speech-recognition model 114 illustrated in FIG. 1. The audio signal vector converter 306 may process multiple samples from an extracted audio signal vector 304 with the audio signal vector conversion model 310 to convert a target sample from the extracted audio signal vector 304 using both forward-mapping and backward-mapping (e.g., by using samples occurring both before and after the sample associated with the target sample). In some aspects, the audio signal vector converter 306 converts the extracted audio signal vector 304 to a converted audio signal vector 312, which may have different amplitude values for at least some of the various frequencies represented in the extracted audio signal vector 304.

In some aspects, a pronunciation sequence recognizer 314 generates a pronunciation sequence 318 based on the converted audio signal vector 312 generated by the audio signal vector converter 306 using an acoustic model 316 from the speech-recognition model 308. The pronunciation sequence recognizer 314 is a nonexclusive example of a pronunciation sequence recognizer, such as the pronunciation sequence recognizer 206 illustrated in FIG. 2. In some aspects, the acoustic model 316 has been adapted by a speech interface learning system such as the speech interface learning system 122. In some aspects, the acoustic model 316 includes a deep neural network. Additionally or alternatively, the acoustic model 316 may include other types of neural networks, hidden Markov models, segmental models, super-segmental models (including hidden dynamic models), maximum entropy models, (hidden) conditional random fields, and other types of models.

The language recognizer 320 generates a recognition result 322, comprising, for example, a word or sequence of words from the pronunciation sequence 318 generated by the pronunciation sequence recognizer 314. The language recognizer 320 is a nonexclusive example of a language recognizer, such as the language recognizer 208 illustrated in FIG. 2. The language recognizer 320 may use a language model (not shown) that comprises a statistical mapping of pronunciation sequences to words. The language recognizer 320 may also use grammar models and other types of models. Additionally or alternatively, the language model may include neural networks of one or more types, hidden Markov models, segmental models, super-segmental models (including hidden dynamic models), maximum entropy models, (hidden) conditional random fields, and other types of models.

Figure 4:
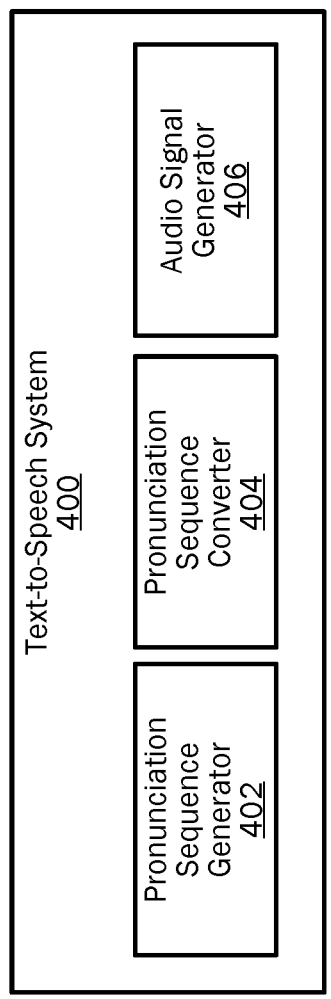
FIG. 4 is a schematic block diagram of an example of the text-to-speech system of FIG. 3.

FIG. 4 is a schematic block diagram of an example text-to-speech system 400. The text-to-speech system 400 is a nonexclusive example of a text-to-speech system, such as the text-to-speech system 112 illustrated in FIG. 1. In this example, the text-to-speech system 400 includes a pronunciation sequence generator 402, a pronunciation sequence converter 404, and an audio signal generator 406. The pronunciation sequence generator 402 generates a pronunciation sequence from text. The pronunciation sequence converter 404 converts a pronunciation sequence based on a pronunciation sequence conversion model. The audio signal generator 406 generates an audio signal from a pronunciation sequence. Examples of these components are described in greater detail with respect to the flow diagram that follows.

Figure 5:
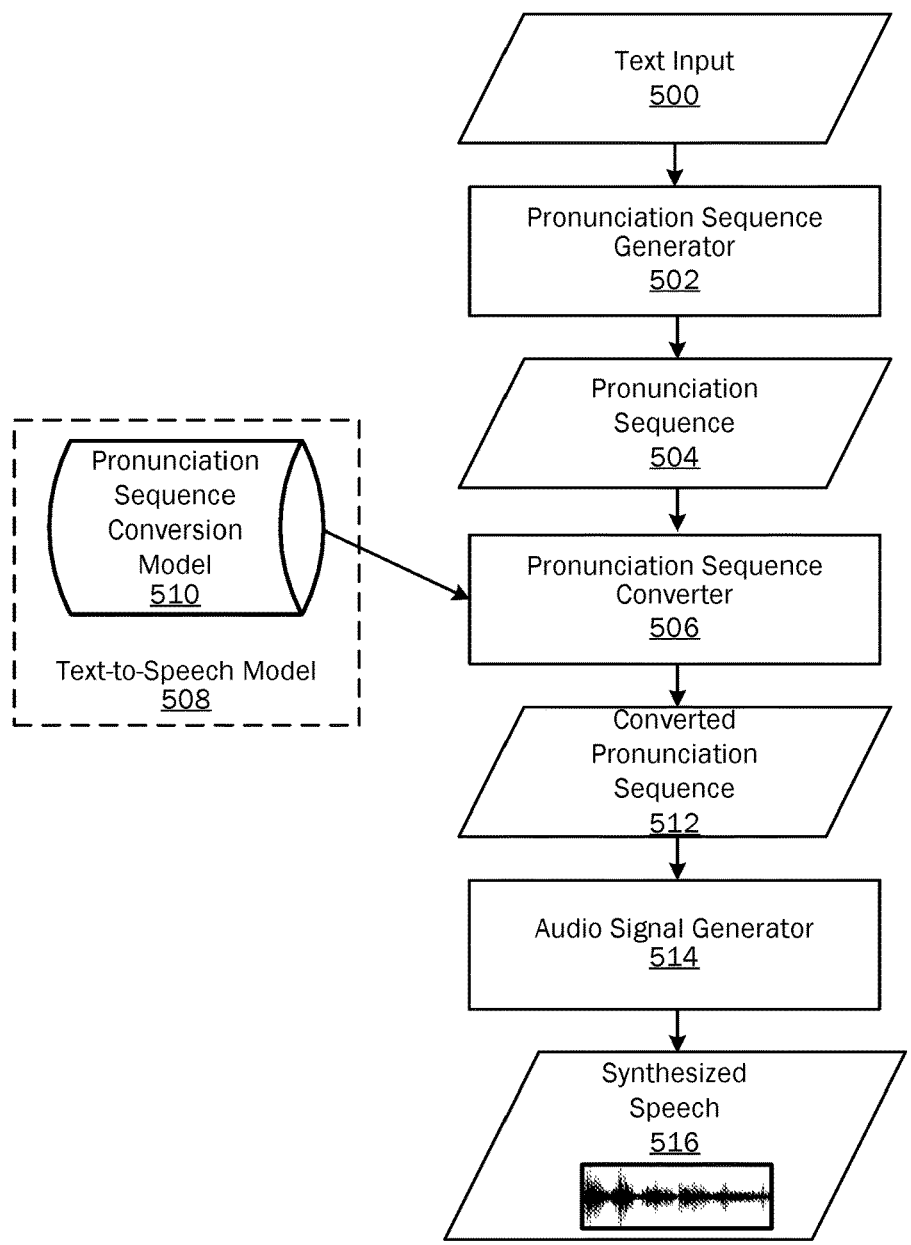
FIG. 5 is an example data flow for the example text-to-speech system of FIG. 4.

FIG. 5 is an example data flow for an example text-to-speech system, such as the text-to-speech system 400 illustrated in FIG. 4. A pronunciation sequence generator 502 generates a pronunciation sequence 504 based on a text input 500. The pronunciation sequence generator 502 is a nonexclusive example of a pronunciation sequence generator, such as the pronunciation sequence generator 402 illustrated in FIG. 4. The text input 500 may be generated by an application running on the user computing device 102, received from the server computing device 104 (e.g., a webpage or a document), or entered by a user. For example, the pronunciation sequence generator 502 may separate the text input 500 into words and then determine potential pronunciations for those words using a pronunciation model (not shown).

The pronunciation sequence converter 506 converts the pronunciation sequence 504 generated by the pronunciation sequence generator 502 using a pronunciation sequence conversion model 510 from the text-to-speech model 508. The pronunciation sequence converter 506 is a nonexclusive example of a pronunciation sequence converter, such as the pronunciation sequence converter 404 illustrated in FIG. 4. The text-to-speech model 508 is a nonexclusive example of a text-to-speech model, such as the text-to-speech model 116 illustrated in FIG. 1.

In some aspects, the pronunciation sequence converter 506 converts the pronunciation sequence 504 into a converted pronunciation sequence 512, in which at least some of the pronunciation signals are different. In some aspects, the pronunciation sequence converter 506 may process multiple pronunciation signals of the pronunciation sequence 504 with the pronunciation sequence conversion model 510 to convert a target pronunciation signal from the pronunciation sequence 504 using both forward-mapping and backward-mapping (e.g., by using pronunciation signals occurring before or after the target pronunciation signal). In some aspects, the pronunciation sequence conversion model 510 includes a recursive neural network. Additionally or alternatively, the acoustic model may include other types of neural networks, hidden Markov models, segmental models, super-segmental models (including hidden dynamic models), maximum entropy models, (hidden) conditional random fields, and other types of models.

The audio signal generator 514 generates synthesized speech 516 from the converted pronunciation sequence 512. The audio signal generator 514 is a nonexclusive example of an audio signal generator, such as the audio signal generator 406 illustrated in FIG. 4. In some aspects, the pronunciation signals in the converted pronunciation sequence 512 are mapped to sounds to generate the synthesized speech 516. In some aspects, the synthesized speech 516 comprises an audio signal that can be output using a speaker.

Figure 6:
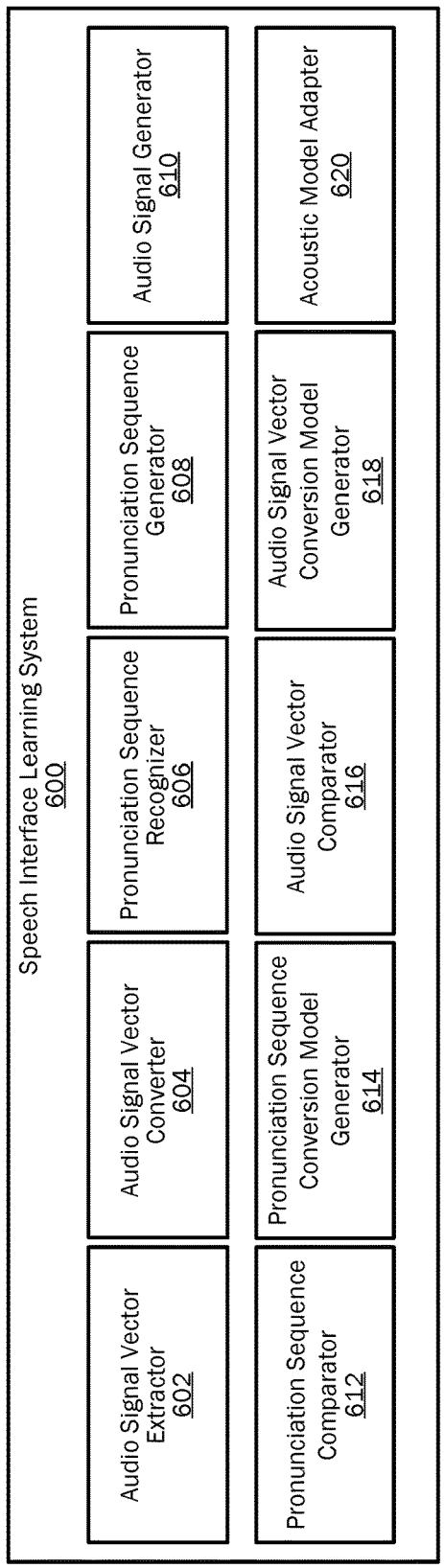
FIG. 6 is a schematic block diagram of the example of the speech interface learning system of FIG. 1.

FIG. 6 is a schematic block diagram of the example of the speech interface learning system 600. The speech interface learning system 600 generates models that are usable by the speech-recognition system 110 and the text-to-speech system 112. For example, the speech interface learning system 600 may generate audio signal vector conversion models such as the audio signal vector conversion model 310, acoustic models such as the acoustic model 316, and pronunciation sequence conversion models such as the pronunciation sequence conversion model 510. In some aspects, the speech interface learning system 600 generates models for use by the speech-recognition system 110 and the text-to-speech system 112 together. For example, when the various models are generated, the models may be stored in a network location that can be accessed by the user computing device 102 (e.g., a shared directory on the server computing device 104) or the models may be transmitted to the user computing device 102.

In this example, the speech interface learning system 600 includes an audio signal vector extractor 602, an audio signal vector converter 604, a pronunciation sequence recognizer 606, a pronunciation sequence generator 608, an audio signal generator 610, a pronunciation sequence comparator 612, a pronunciation sequence conversion model generator 614, an audio signal vector comparator 616, an audio signal vector conversion model generator 618, and an acoustic model adapter 620. Examples of these components are described in greater detail with respect to the example methods and data flow diagrams that follow.

The audio signal vector extractor 602, the audio signal vector converter 604, and the pronunciation sequence recognizer 606 may be similar to the audio signal vector extractor 202, audio signal vector converter 204, and the pronunciation sequence recognizer 206, respectively, which are illustrated and described with respect to at least FIG. 2. The pronunciation sequence generator 608 and the audio signal generator 610 may be similar to the pronunciation sequence generator 402 and the audio signal generator 406, respectively, which are illustrated and described with respect to at least FIG. 4.

Figure 7:
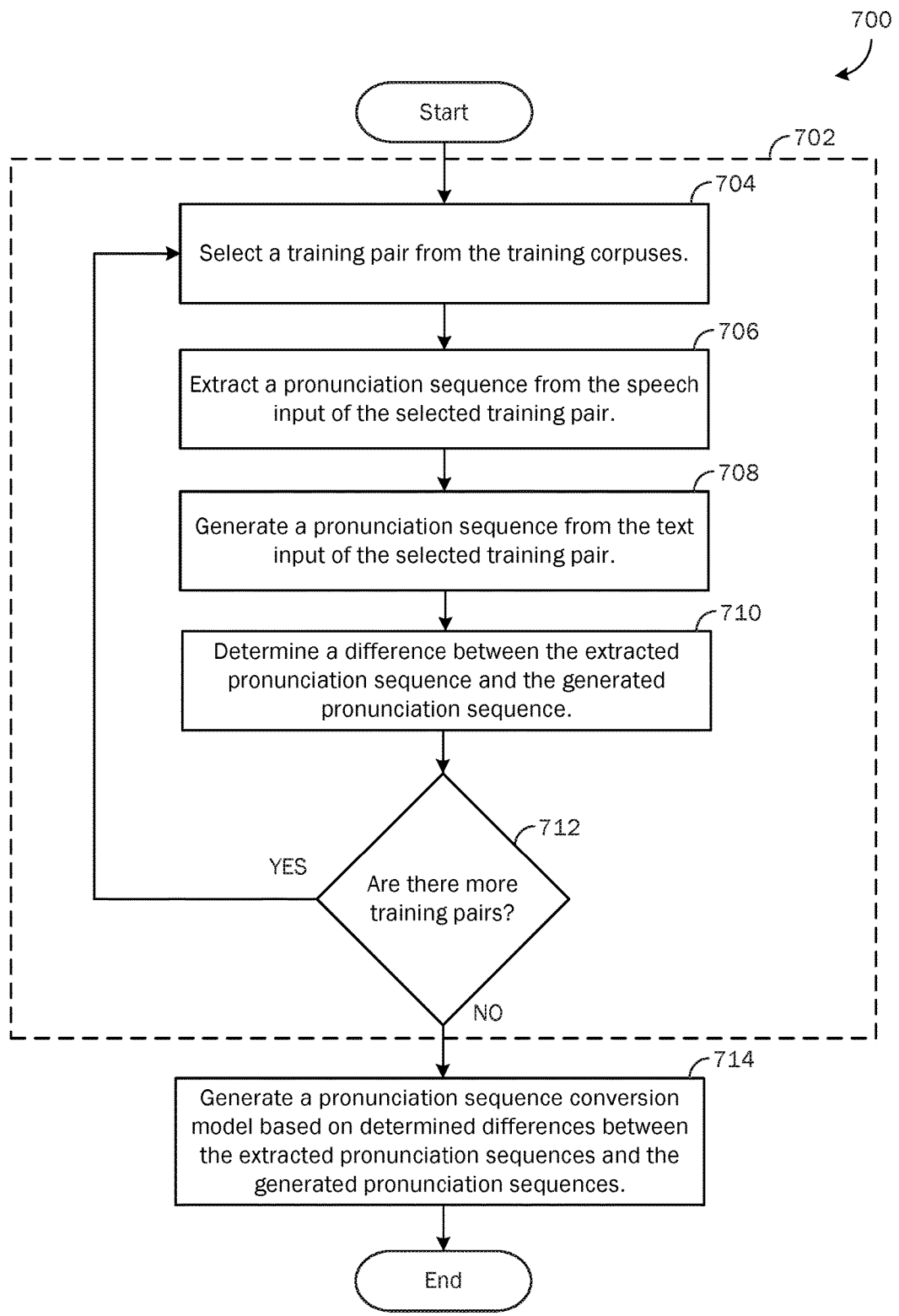
FIG. 7 illustrates an example method of generating a pronunciation sequence conversion model performed by some aspects of the speech interface learning system of FIG. 6.
Figure 8:
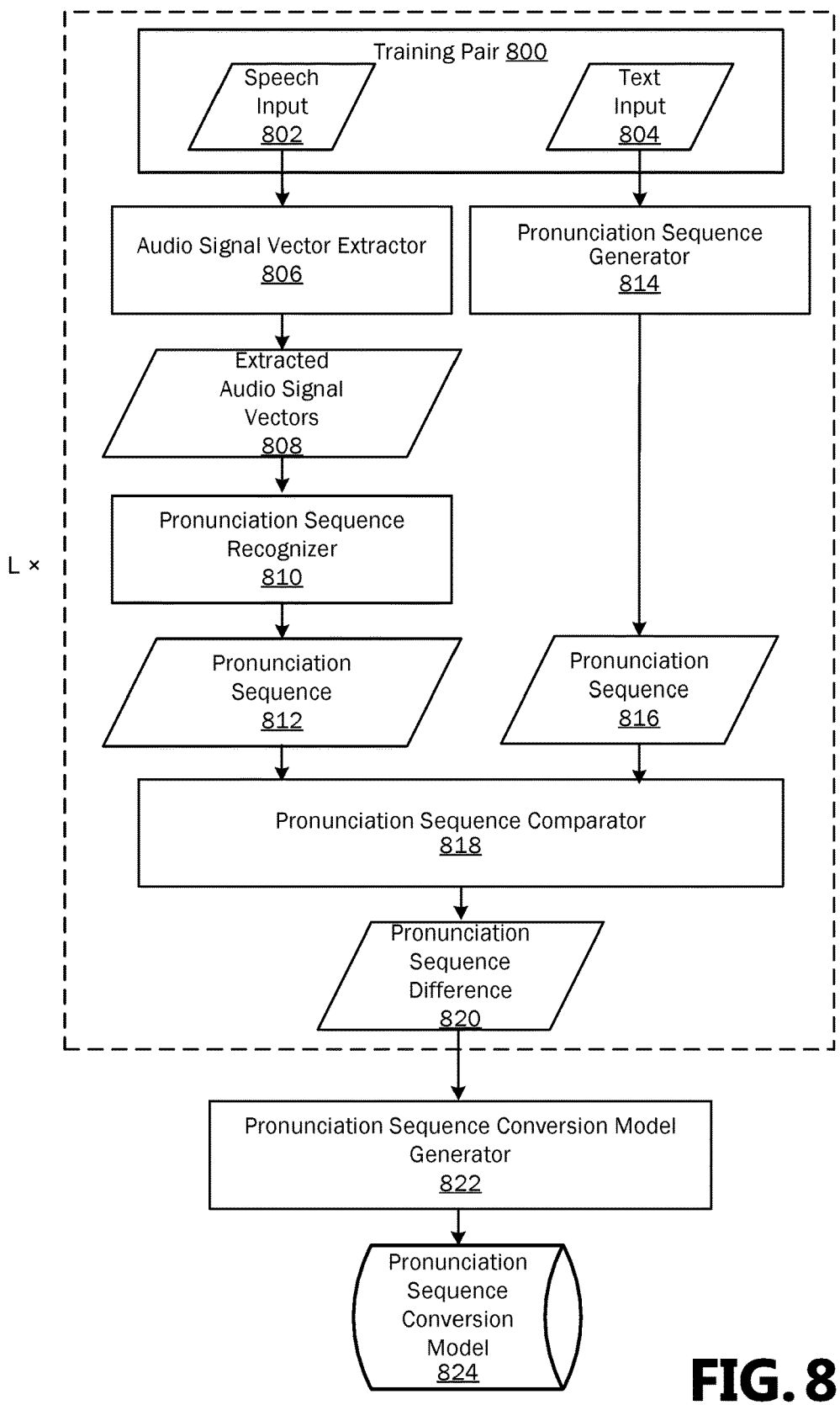
FIG. 8 illustrates an example data flow while the method of FIG. 7 is performed.

FIGS. 7 and 8 illustrate an example of the speech interface learning system 122 generating a pronunciation sequence conversion model 824. FIG. 7 illustrates an example method 700 of generating a pronunciation sequence conversion model 824 performed by some aspects of the speech interface learning system 122. FIG. 8 illustrates an example data flow while the method 700 is performed. In examples, the method 700 may be executed on a device comprising at least one processor configured to store and execute operations, programs, or instructions.

In some aspects, the method 700 begins with a loop 702, which may be performed once for each training pair in the training corpuses. In some aspects, the training corpuses include both the speech-recognition training corpus 124 and the text-to-speech training corpus 126. The speech-recognition training corpus 124 may comprise training pairs from many different speakers, but generally only a few training pairs from any one speaker. Thus the speech-recognition training corpus 124 may include training pairs that represent a wide variety of speakers, speaking styles, and voices. In contrast, the text-to-speech training corpus 126 may comprise training pairs recorded by one or a few speakers speaking many words. In this manner, the text-to-speech training corpus 126 may represent a large vocabulary from a particular speaker.

At operation 704, a training pair 800 is selected from the training corpuses. The training pair 800 comprises a speech input 802 comprising one or more words being spoken and a text input 804 that includes the text of the word or words spoken in the speech input. In some aspects, the speech input 802 is a recording of the words being spoken. In some aspect, training pairs are selected from the training corpuses according to a variety of orders such as the order the training pairs were added to the corpuses, an identifier value assigned to the training pair, etc.

At operation 706, the extracted pronunciation sequence 812 is extracted from the speech input 802. In some aspects, the extracted pronunciation sequence 812 is generated similarly to how the pronunciation sequence 318 is generated when speech recognition is being performed by the speech-recognition system 110, which is illustrated and described with respect to at least FIG. 3. For example, in some aspects, an audio signal vector extractor 806 extracts an audio signal vector 808 from the speech input 802. The extracted audio signal vector 808 is then used as input by a pronunciation sequence recognizer 810 to generate the extracted pronunciation sequence 812. The audio signal vector extractor 806 is a nonexclusive example of an audio signal vector extractor, such as the audio signal vector extractor 602 illustrated in FIG. 6. The pronunciation sequence recognizer 810 is a nonexclusive example of a pronunciation sequence recognizer, such as the pronunciation sequence recognizer 606 illustrated in FIG. 6.

At operation 708, the pronunciation sequence 816 is generated from the text input 804 by a pronunciation sequence generator 814. The pronunciation sequence generator 814 is a nonexclusive example of a pronunciation sequence generator, such as the pronunciation sequence generator 608 illustrated in FIG. 6. In some aspects, the pronunciation sequence 816 is generated similarly to how the pronunciation sequence 504 is generated when speech synthesis is being performed by the text-to-speech system 112, which is illustrated and described with respect to at least FIG. 5.

At operation 710, a pronunciation sequence difference 820 between the extracted pronunciation sequence 812 and the generated pronunciation sequence 816 is determined by a pronunciation sequence comparator 818. The pronunciation sequence comparator 818 is a nonexclusive example of a pronunciation sequence comparator, such as the pronunciation sequence comparator 612 illustrated in FIG. 6. In some aspects, the extracted pronunciation sequence 812 is aligned with the generated pronunciation sequence 816. The aligned sequences may then be compared to one another to determine the difference between the extracted pronunciation sequence 812 and the generated pronunciation sequence 816. The pronunciation sequence difference 820 may comprise a data structure that includes the changes (e.g., insertions, deletions, and substitutions) to the pronunciation signals in the generated pronunciation sequence 816 to arrive at the extracted pronunciation sequence 812. In some aspects, a distance is also calculated between the extracted pronunciation sequence 812 and the generated pronunciation sequence 816. The distance may comprise a numeric value with a magnitude that is related to the similarity between the extracted pronunciation sequence 812 and the generated pronunciation sequence 816 (e.g., a smaller distance indicates that the sequences are more similar to one another than a larger distance).

At operation 712, it is determined whether there are more training pairs to process in the loop 702. If so, the method 700 returns to operation 704, to repeat the loop 702 on a different training pair 800. If not, the method proceeds to operation 714. For example, if there are L number of training pairs, the loop may be performed L times to generate L number of the pronunciation sequence differences 820.

At operation 714, the pronunciation sequence conversion model 824 is generated by based on the differences between the extracted pronunciation sequences and the generated pronunciation sequences determined in the loop 702. The pronunciation sequence conversion model 824 is a nonexclusive example of a pronunciation sequence conversion model, such as the pronunciation sequence conversion model 510 illustrated in FIG. 5. For example, the pronunciation sequence conversion model 824 may be generated by the pronunciation sequence conversion model generator 822. The pronunciation sequence conversion model generator 822 is a nonexclusive example of a pronunciation sequence conversion model generator, such as the pronunciation sequence conversion model generator 614 illustrated in FIG. 6.

In some aspects, a portion of the training pairs in the training corpuses are used to train the pronunciation sequence conversion model 824. Additionally, a portion of the training pairs in the training corpuses may be used as validation data to validate the pronunciation sequence conversion model 824. For example, various parameters of the pronunciation sequence conversion model 824 may be adjusted using optimization techniques (e.g., hill climbing, gradient descent) to improve the performance of the pronunciation sequence conversion model 824 on the validation data.

Figure 9:
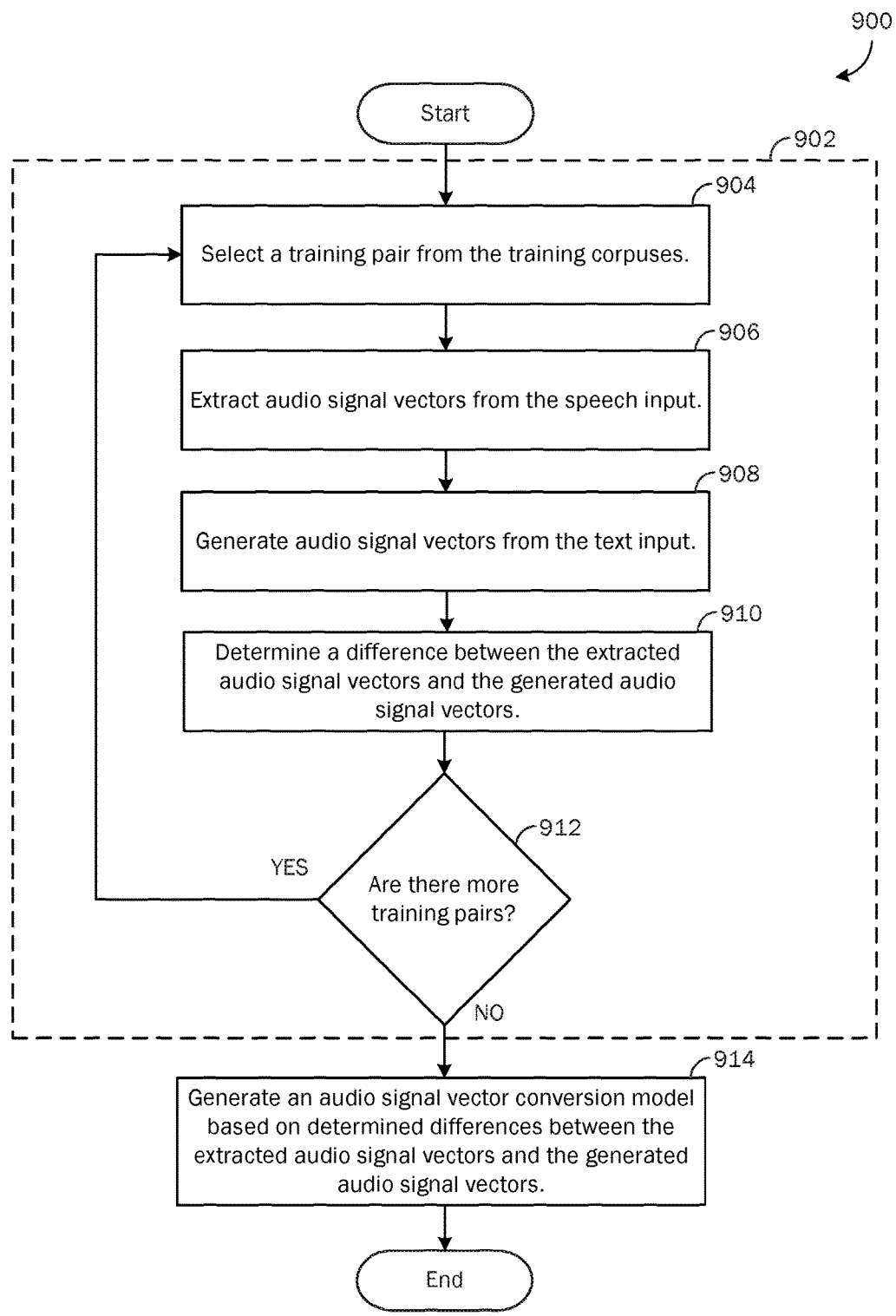
FIG. 9 illustrates an example method of generating a pronunciation sequence conversion model performed by some aspects of the speech interface learning system of FIG. 6.
Figure 10:
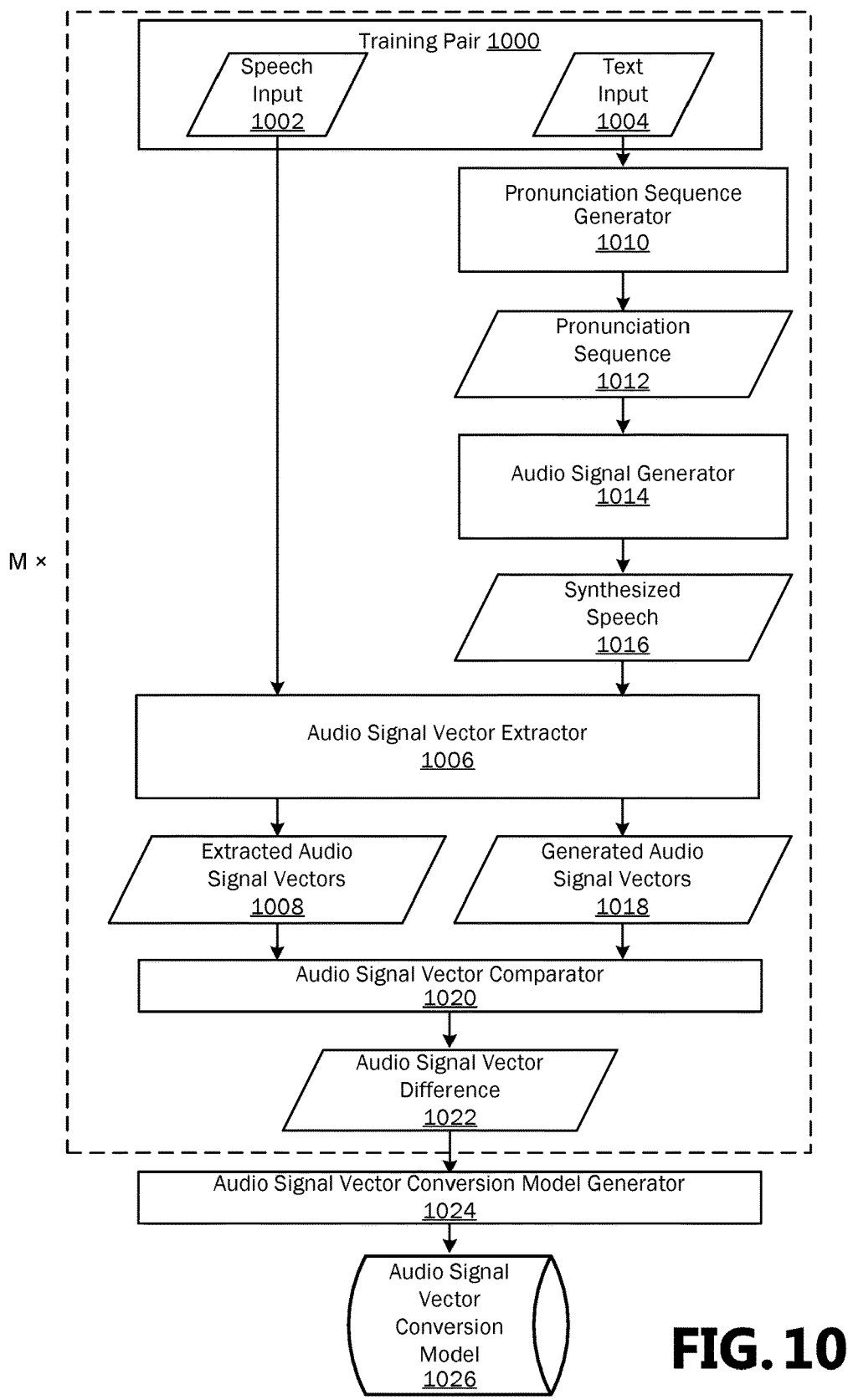
FIG. 10 illustrates an example data flow while the method of FIG. 9 is performed.

FIGS. 9 and 10 illustrate an example of the speech interface learning system 122 generating an audio signal vector conversion model 1026. FIG. 9 illustrates an example method 900 of generating the audio signal vector conversion model 1026 performed by some aspects of the speech interface learning system 122. FIG. 10 illustrates an example data flow while the method 900 is performed. In examples, the method 900 may be executed on a device comprising at least one processor configured to store and execute operations, programs, or instructions.

In some aspects, the method 900 begins with a loop 902, which may be performed once for each training pair 1000 in the training corpuses. In some aspects, the loop 902 is performed on the same training pairs as the loop 702, which has been described previously with respect to at least FIGS. 7 and 8. For example, the training corpuses may include both the speech-recognition training corpus 124 and the text-to-speech training corpus 126.

At operation 904, a training pair 1000 is selected from the training corpuses. The training pair 1000 comprises a speech input 1002 comprising one or more words being spoken and a text input 1004 that includes the text of the word or words spoken in the speech input. In some aspects, the operation 904 is similar to the operation 704, which has been previously described with respect to at least FIG. 7.

At operation 906, the audio signal vector 1008 is extracted from the speech input 1002. In some aspects, the audio signal vector 1008 is extracted by the audio signal vector extractor 1006. The audio signal vector extractor 1006 is a nonexclusive example of an audio signal vector extractor, such as the audio signal vector extractor 602 and may operate similarly to the audio signal vector extractor 302, which has been previously described with respect to at least FIG. 3.

At operation 908, an audio signal vector 1018 is generated from the text input 1004. In some aspects, the audio signal vector 1018 is generated by generating synthesized speech 1016 from the text input 1004 and then extracting an audio signal vector from the synthesized speech 1016 using the audio signal vector extractor 1006. For example, in some aspects, the text input 1004 is processed with a pronunciation sequence generator 1010 to generate a pronunciation sequence 1012, which is then processed with an audio signal generator 1014 to generate the synthesized speech 1016. The pronunciation sequence generator 1010 is a nonexclusive example of a pronunciation sequence generator, such as the pronunciation sequence generator 608 illustrated in FIG. 6. The audio signal generator 1014 is a nonexclusive example of an audio signal generator, such as the audio signal generator 610 illustrated in FIG. 6.

At operation 910, an audio signal vector difference 1022 between the extracted audio signal vector 1008 and the generated audio signal vector 1018 is determined by the audio signal vector comparator 1020. The audio signal vector comparator 1020 is a nonexclusive example of an audio signal vector comparator, such as the audio signal vector comparator 616 illustrated in FIG. 6. In some aspects, the audio signal vector difference 1022 comprises a data structure that includes the changes (e.g., insertions, deletions, and substitutions) to the extracted audio signal vector 1008 to arrive at the generated audio signal vector 1018. In some aspects, a distance is also calculated between the extracted audio signal vector 1008 and the generated audio signal vector 1018. The distance may comprise a numeric value with a magnitude that is related to the similarity between the extracted audio signal vector 1008 and the generated audio signal vector 1018.

At operation 912, it is determined whether there are more training pairs to process in the loop 902. If so, the method 900 returns to operation 904, to repeat the loop 902 on a different training pair 1000. If not, the method proceeds to operation 914. For example, if there are M number of training pairs, the loop may be performed M times to generate M number of the audio signal vector differences 1022.

At operation 914, the audio signal vector conversion model 1026 is generated by an audio signal vector conversion model generator 1024 based on the audio signal vector differences 1022 between the extracted audio signal vector 1008 and the generated audio signal vector 1018 determined in the loop 902. The audio signal vector conversion model generator 1024 is a nonexclusive example of an audio signal vector conversion model generator, such as the audio signal vector conversion model generator 618 illustrated in FIG. 6. The audio signal vector conversion model 1026 is a nonexclusive example of an audio signal vector conversion model, such as the audio signal vector conversion model 310 illustrated in FIG. 3.

In some aspects, the audio signal vector conversion model 1026 is generated to approximately convert the extracted audio signal vector 1008 to the generated audio signal vector 1018. In some aspects, a portion of the training pairs in the training corpuses is used to train the audio signal vector conversion model 1026. Additionally, a portion of the training pairs in the training corpuses may be used as validation data to validate the audio signal vector conversion model 1026. For example, various parameters of the audio signal vector conversion model 1026 may be adjusted using optimization techniques (e.g., hill climbing, gradient descent) to improve the performance of the audio signal vector conversion model 1026 on the validation data.

Figure 11:
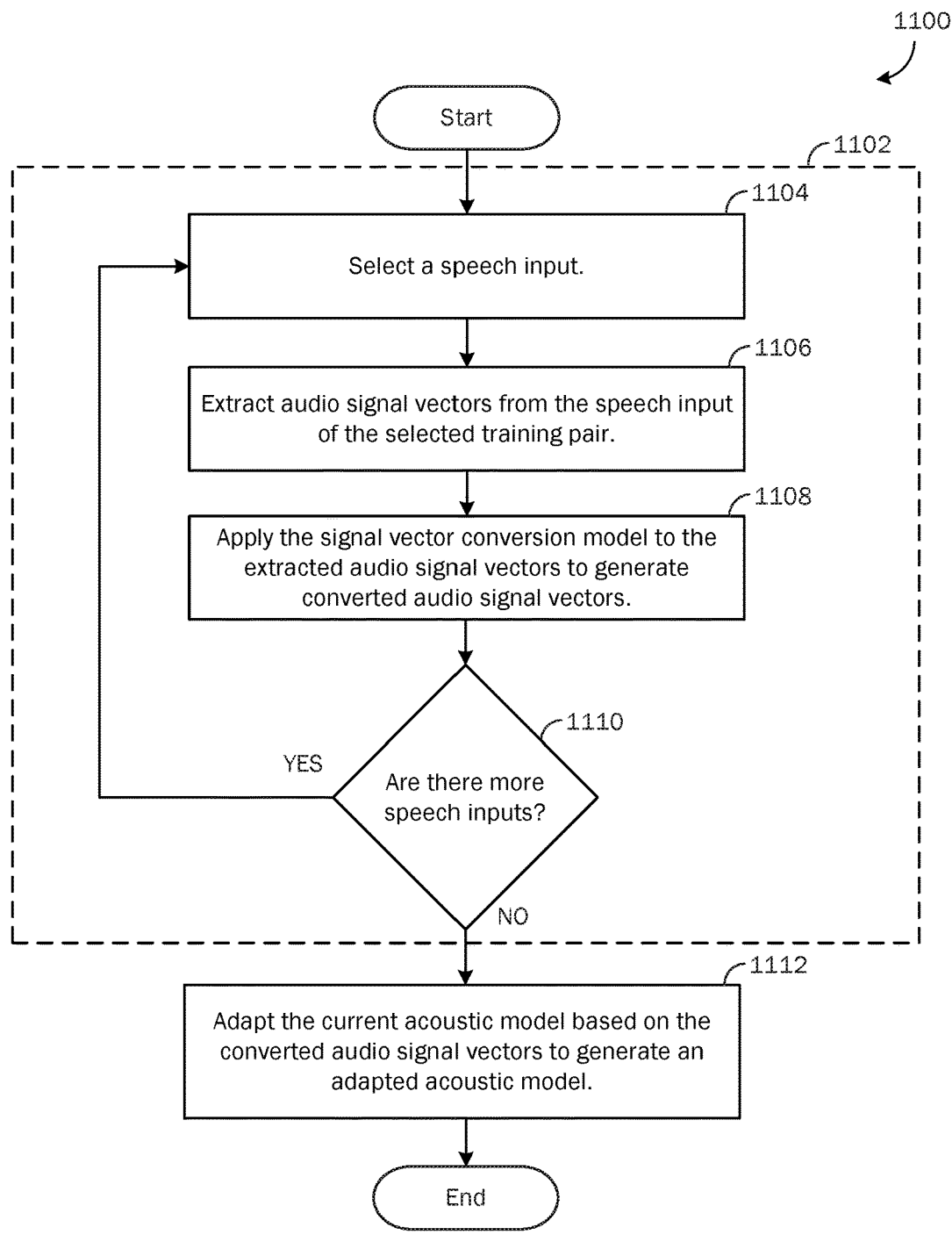
FIG. 11 illustrates an example method of adapting an acoustic model performed by some aspects of the speech interface learning system of FIG. 6.
Figure 12:
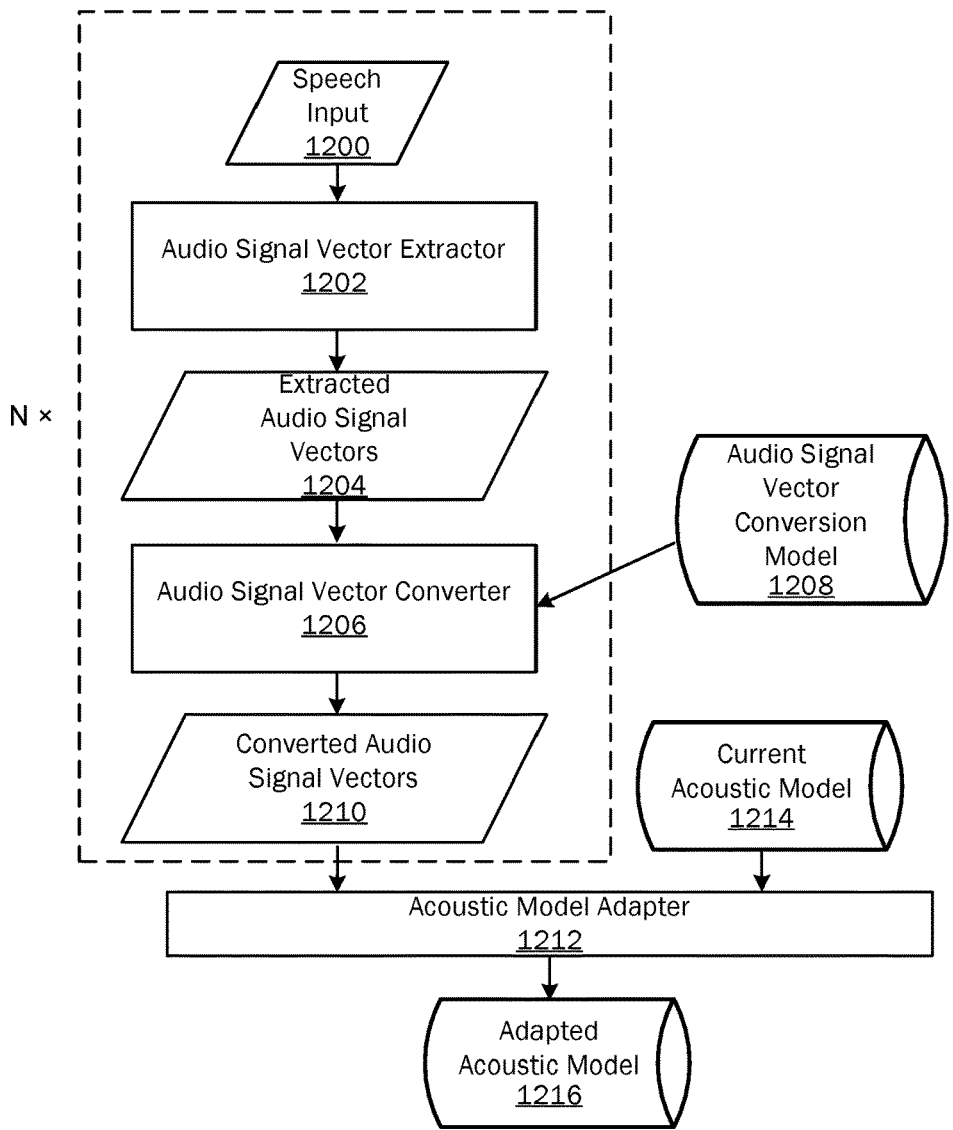
FIG. 12 illustrates an example data flow while the method of FIG. 11 is performed.

FIGS. 11 and 12 illustrate an example of the speech interface learning system 122 adapting an acoustic model to generate an adapted acoustic model. FIG. 11 illustrates an example method 1100 of adapting an acoustic model performed by some aspects of the speech interface learning system 122. FIG. 12 illustrates an example data flow while the method 1100 is performed. In examples, the method 1100 may be executed on a device comprising at least one processor configured to store and execute operations, programs, or instructions.

In some aspects, the method 1100 begins with a loop 1102, which may be performed once for each speech input 1200 that is available. In some aspects, the speech inputs are from training pairs in the training corpuses. In some aspects, the loop 1102 is performed on the speech input from at least some of the same training pairs as the loop 702, which has been described previously with respect to at least FIGS. 7 and 8. For example, the training corpuses may include both the speech-recognition training corpus 124 and the text-to-speech training corpus 126.

At operation 1104, a speech input 1200 is selected. For example, the speech input 1200 may be selected from a training pair selected from the training corpuses. As described above, a training pair includes a speech input comprising one or more words being spoken. In some aspects, selecting a training pair in operation 1104 is similar to the operation 704, which has been previously described with respect to at least FIG. 7.

At operation 1106, an audio signal vector 1204 is extracted from the speech input 1200 of the selected training pair. In some aspects, the audio signal vector extractor 1202 extracts the audio signal vector 1204 by sampling the speech input 1200 and determining the amplitude of the audio signal of the speech input 1200 at various frequencies. The audio signal vector extractor 1202 is a nonexclusive example of an audio signal vector extractor, such as the audio signal vector extractor 602 illustrated in FIG. 6.

At operation 1108, an audio signal vector conversion model 1208 is applied to the extracted audio signal vector 1204 by the audio signal vector converter 1206 to generate converted audio signal vector 1210. In some aspects, the audio signal vector conversion model 1208 is generated by the method 900. The audio signal vector conversion model 1208 is a nonexclusive example of an audio signal vector conversion model, such as the audio signal vector conversion model 310 illustrated in FIG. 3. The audio signal vector converter 1206 is a nonexclusive example of an audio signal vector converter, such as the audio signal vector converter 604 illustrated in FIG. 6.

At operation 1110, it is determined whether there are more speech inputs to process in the loop 1102. If so, the method 1100 returns to operation 1104, to repeat the loop 1102 on another speech input. If not, the method proceeds to operation 1112. For example, if there are N number of speech inputs (e.g., there are N number of training pairs), the loop may be performed N times to generate N number of the converted audio signal vectors 1210.

At operation 1112, a current acoustic model 1214 is adapted by the acoustic model adapter 1212 based on the converted audio signal vector 1210 to generate an adapted acoustic model 1216. The acoustic model adapter 1212 is a nonexclusive example of an acoustic model adapter, such as the acoustic model adapter 620 illustrated in FIG. 6. The current acoustic model 1214 is a non-exclusive example of an acoustic model such as the acoustic model 316 illustrated in FIG. 3. In some aspects, the adapted acoustic model 1216 is then used in future speech recognition operations.

In some aspects, the adapted acoustic model 1216 is generated frequently (or even continuously) as new training data becomes available. For example, after the adapted acoustic model 1216 is generated and new training data is received or identified, the adapted acoustic model 1216 may be used as the current acoustic model 1214 and may be further adapted by the acoustic model adapter 1212 based on the new training data. Alternatively or additionally, the adapted acoustic model 1216 may be generated periodically. Once generated, the adapted acoustic model 1216 may be stored on the server computing device 104 or elsewhere where it may be accessed by the speech-recognition system 110. Additionally or alternatively, the adapted acoustic model 1216 may be transferred (e.g., as part of an application update) to the user computing device 102 for use by the speech-recognition system 110.

In some aspects, the adapted acoustic model 1216 is included in the speech-recognition model 114 and used by the speech-recognition system 110 to perform speech recognition. In some aspects, a pronunciation sequence recognizer, such as the pronunciation sequence recognizer 206, uses the adapted acoustic model 1216 to generate a pronunciation sequence during speech recognition operations as illustrated and described with respect to at least FIG. 3.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, watches, netbooks, tablet or slate type computers, notebook computers, and laptop computers), hand-held devices, entertainment devices (e.g., smart televisions, media players including streaming media players, gaming systems), multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 13:
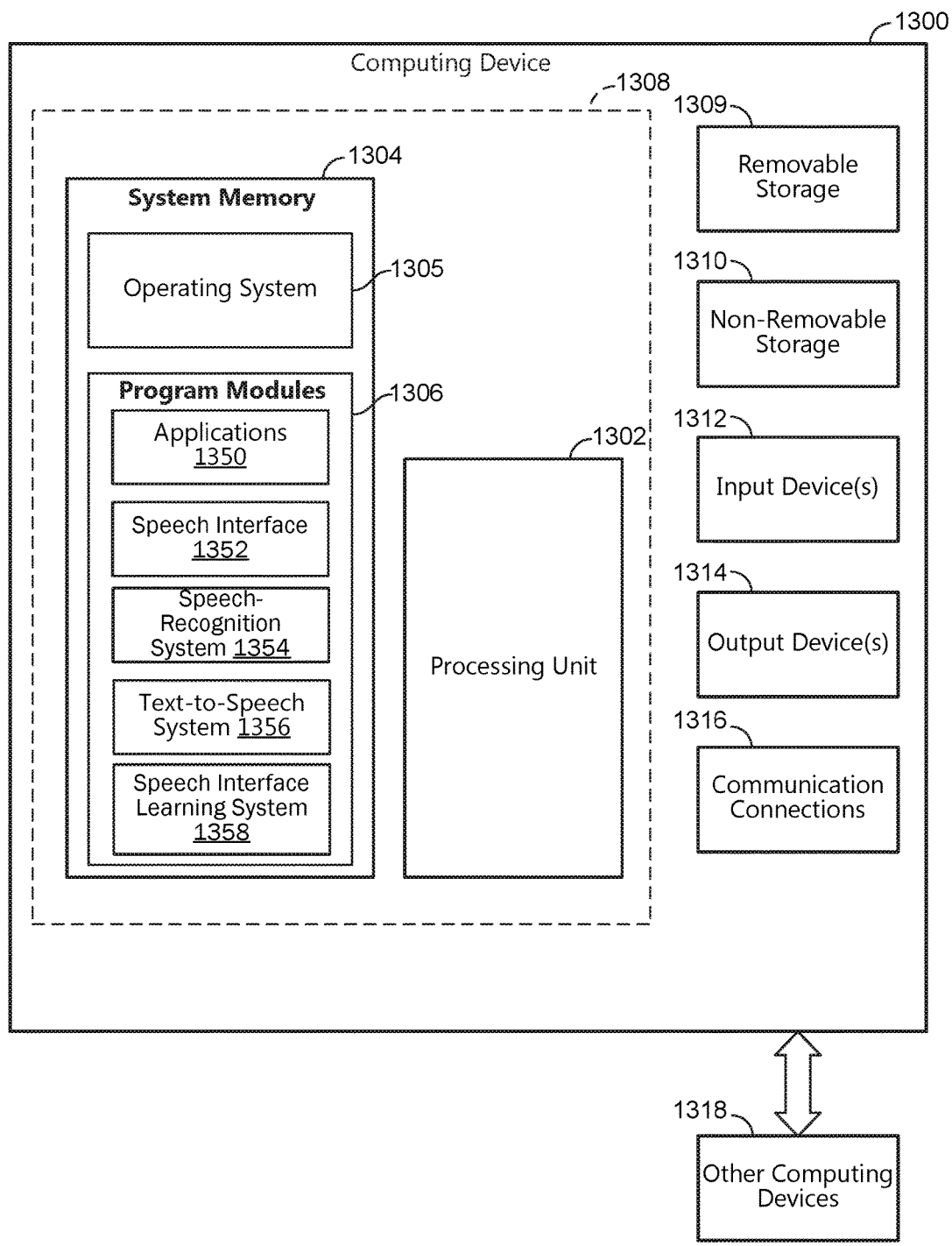
FIG. 13 is a block diagram illustrating example physical components of a computing device.
Figure 14A:
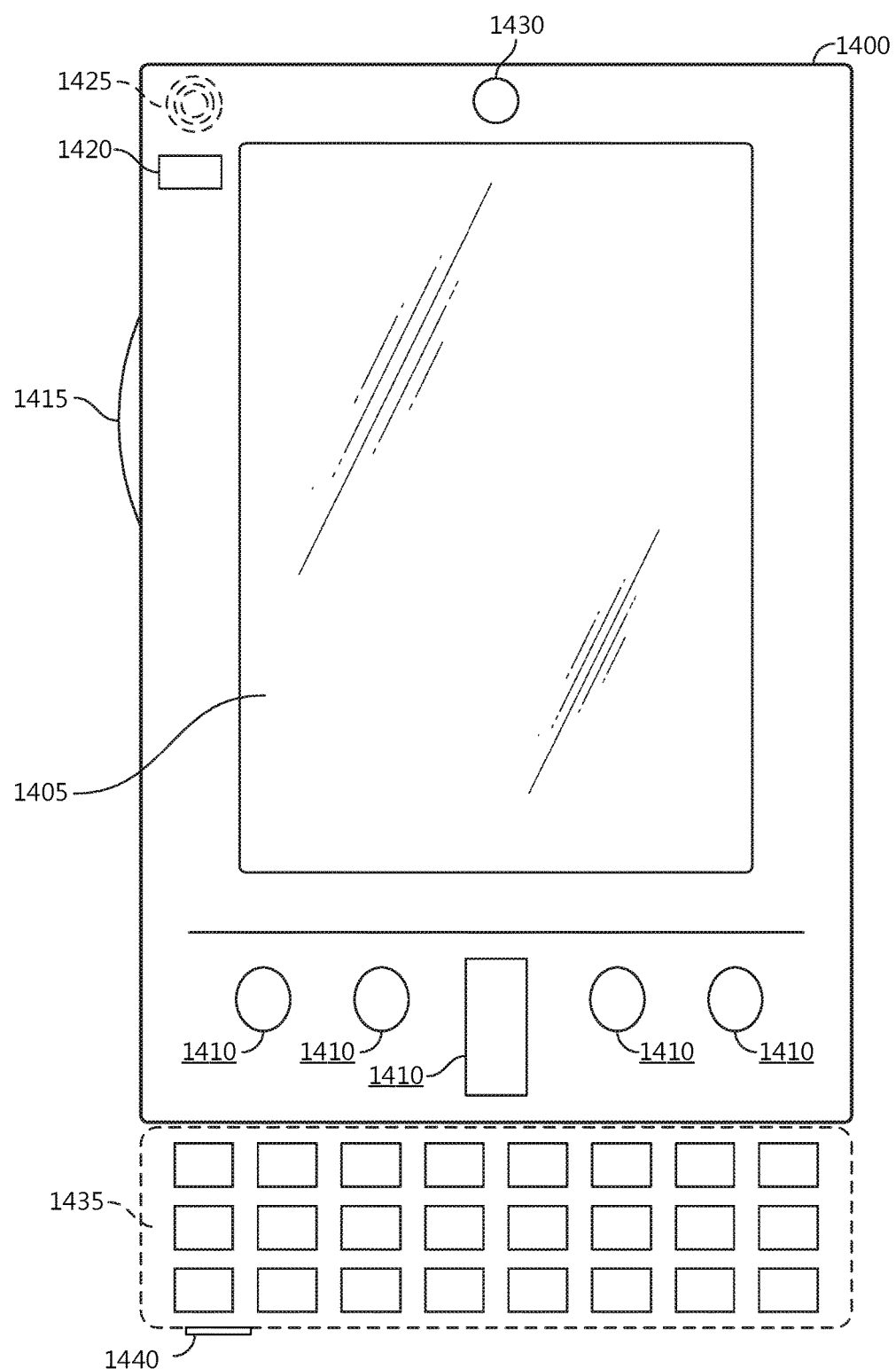
FIGS. 14A and 14B are block diagrams of a mobile computing device.
Figure 14B:
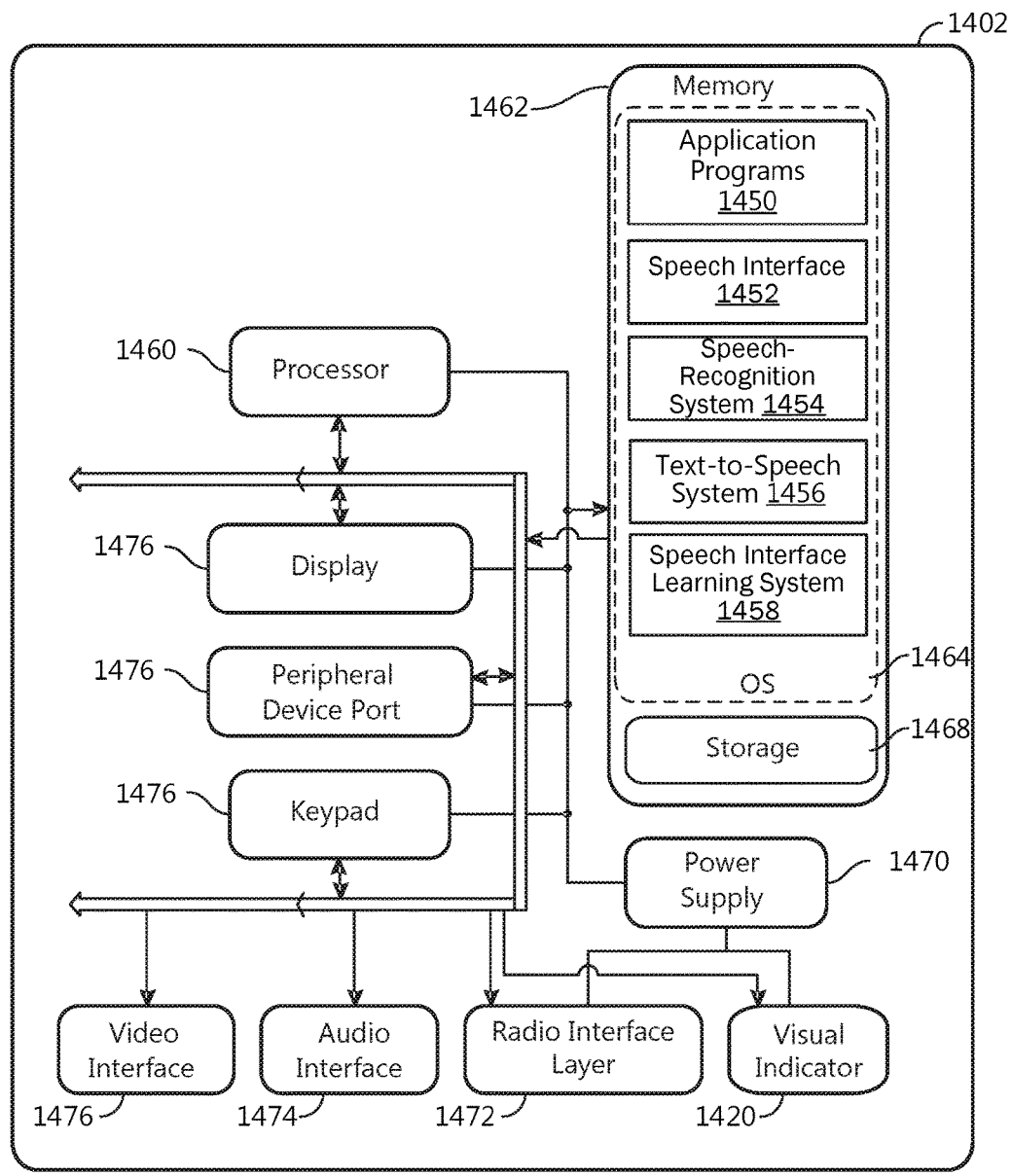
Figure 15:
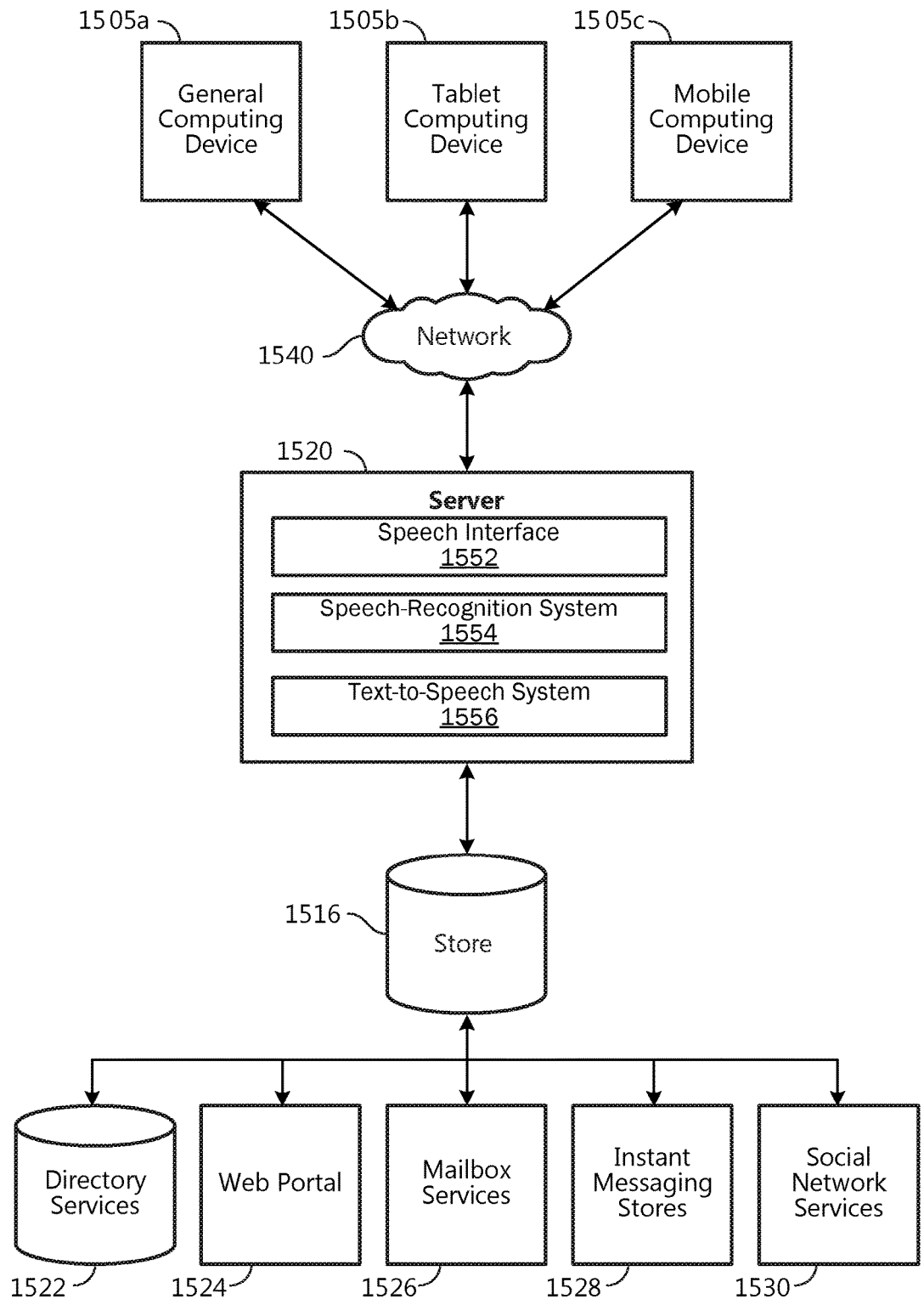
FIG. 15 is a block diagram of a distributed computing system.

FIGS. 13-15 and the associated descriptions provide a discussion of a variety of operating environments in which examples are practiced. However, the devices and systems illustrated and discussed with respect to FIGS. 13-15 are for purposes of example and illustration and are not limiting of a vast number of computing device configurations that are utilized for practicing aspects, described herein.

FIG. 13 is a block diagram illustrating physical components (i.e., hardware) of a computing device 1300 with which examples of the present disclosure may be practiced. The physical components described below are examples of the physical components of aspects of the user computing device 102 and the server computing device 104. In a basic configuration, the computing device 1300 includes at least one processing unit 1302 and a system memory 1304. According to an aspect, depending on the configuration and type of computing device, the system memory 1304 comprises, but is not limited to, volatile storage (e.g., random access memory), non-volatile storage (e.g., read-only memory), flash memory, or any combination of such memories. According to an aspect, the system memory 1304 includes an operating system 1305 and one or more program modules 1306 suitable for running software applications 1350 and, for example, one or more of a speech interface 1352, which may be similar to the speech interface 108; a speech-recognition system 1354, which may be similar to the speech-recognition system 110; a text-to-speech system 1356, which may be similar to the text-to-speech system 112; and a speech interface learning system 1358, which may be similar to the speech-interface learning system 122. The operating system 1305, for example, is suitable for controlling the operation of the computing device 1300. Furthermore, aspects are practiced in conjunction with a graphics library, other operating systems, or any other application program, and are not limited to any particular application or system. This basic configuration is illustrated in FIG. 13 by those components within a dashed line 1308. According to an aspect, the computing device 1300 has additional features or functionality. For example, according to an aspect, the computing device 1300 includes additional data storage devices (removable and/or non-removable) such as, for example, magnetic disks, optical disks, or tapes. Such additional storage is illustrated in FIG. 13 by a removable storage device 1309 and a non-removable storage device 1310.

As stated above, according to an aspect, a number of program modules and data files are stored in the system memory 1304. While executing on the processing unit 1302, the program modules 1306 (e.g., speech interface 108, speech interface learning system 122) perform processes including, but not limited to, one or more of the operations of the methods 700, 900, and 1100 illustrated in FIGS. 7, 9, and 11 respectively. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 13 are integrated onto a single integrated circuit.

According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 1300 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 1300 has one or more input device(s) 1312 such as a keyboard, a mouse, a pen, a sound input device, a touch input device, etc. The output device(s) 1314 such as a display, speakers, a printer, etc. are also included according to an aspect. The aforementioned devices are examples and others may be used. According to an aspect, the computing device 1300 includes one or more communication connections 1316 allowing communications with other computing devices 1318. Examples of suitable communication connections 1316 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 1304, the removable storage device 1309, and the non-removable storage device 1310 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1300. According to an aspect, any such computer storage media is part of the computing device 1300. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 14A and 14B illustrate a mobile computing device 1400, for example, a mobile telephone, a smart phone, a tablet personal computer, a laptop computer, and the like, with which aspects may be practiced. With reference to FIG. 14A, an example of a mobile computing device 1400 for implementing the aspects is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. According to an aspect, the display 1405 of the mobile computing device 1400 functions as an input device (e.g., a touch screen display). If included, an optional side input element 1415 allows further user input. According to an aspect, the side input element 1415 is a rotary switch, a button, or any other type of manual input element. In alternative examples, mobile computing device 1400 incorporates more or fewer input elements. For example, the display 1405 may not be a touch screen in some examples. In alternative examples, the mobile computing device 1400 is a portable phone system, such as a cellular phone. According to an aspect, the mobile computing device 1400 includes an optional keypad 1435. According to an aspect, the optional keypad 1435 is a physical keypad. According to another aspect, the optional keypad 1435 is a "soft" keypad generated on the touch screen display. In various aspects, the output elements include the display 1405 for showing a graphical user interface (GUI), a visual indicator 1420 (e.g., a light emitting diode), and/or an audio transducer 1425 (e.g., a speaker). In some examples, the mobile computing device 1400 incorporates a vibration transducer for providing the user with tactile feedback. In yet another example, the mobile computing device 1400 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1400 incorporates peripheral device port 1440, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one example of a mobile computing device. That is, the mobile computing device 1400 incorporates a system (i.e., an architecture) 1402 to implement some examples. In one example, the system 1402 is implemented as a "smart phone" capable of running one or more applications (e.g., browser, e-mail, calendaring, contact managers, messaging clients, games, and media clients/players). In some examples, the system 1402 is integrated as a computing device, such as an integrated personal digital assistant (PDA) and wireless phone.

According to an aspect, one or more application programs 1450 are loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. According to an aspect, one or more of a speech interface 1452, which may be similar to the speech interface 108; a speech-recognition system 1454, which may be similar to the speech-recognition system 110; a text-to-speech system 1456, which may be similar to the text-to-speech system 112; and a speech interface learning system 1458, which may be similar to the speech-interface learning system 122, are loaded into memory 1462. The system 1402 also includes a non-volatile storage area 1468 within the memory 1462. The non-volatile storage area 1468 is used to store persistent information that should not be lost if the system 1402 is powered down. The application programs 1450 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400.

According to an aspect, the system 1402 has a power supply 1470, which is implemented as one or more batteries. According to an aspect, the power supply 1470 further includes an external power source, such as an AC adapter or a powered docking cradle that supplements or recharges the batteries.

According to an aspect, the system 1402 includes a radio 1472 that performs the function of transmitting and receiving radio frequency communications. The radio 1472 facilitates wireless connectivity between the system 1402 and the "outside world," via a communications carrier or service provider. Transmissions to and from the radio 1472 are conducted under control of the operating system 1464. In other words, communications received by the radio 1472 may be disseminated to the application programs 1450 via the operating system 1464, and vice versa.

According to an aspect, the visual indicator 1420 is used to provide visual notifications and/or an audio interface 1474 is used for producing audible notifications via the audio transducer 1425. In the illustrated example, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. According to an aspect, the system 1402 further includes a video interface 1476 that enables an operation of an on-board camera 1430 to record still images, video stream, and the like.

According to an aspect, a mobile computing device 1400 implementing the system 1402 has additional features or functionality. For example, the mobile computing device 1400 includes additional data storage devices (removable and/or non-removable) such as, magnetic disks, optical disks, or tape. Such additional storage is illustrated in FIG. 14B by the non-volatile storage area 1468.

According to an aspect, data/information generated or captured by the mobile computing device 1400 and stored via the system 1402 are stored locally on the mobile computing device 1400, as described above. According to another aspect, the data are stored on any number of storage media that are accessible by the device via the radio 1472 or via a wired connection between the mobile computing device 1400 and a separate computing device associated with the mobile computing device 1400, for example, a server computer in a distributed computing network, such as the Internet. As should be appreciated such data/information are accessible via the mobile computing device 1400 via the radio 1472 or via a distributed computing network. Similarly, according to an aspect, such data/information are readily transferred between computing devices for storage and use according to well-known data/information transfer and storage means, including electronic mail and collaborative data/information sharing systems.

FIG. 15 illustrates one example of the architecture of a system for speech interface with a speech interface learning system as described above. Content developed, interacted with, or edited in association with the speech interface 108 is enabled to be stored in different communication channels or other storage types. For example, various documents may be stored using a directory service 1522, a web portal 1524, a mailbox service 1526, an instant messaging store 1528, or a social networking site 1530. The speech interface 108 is operative to use any of these types of systems or the like for based on speech input from the user, as described herein. According to an aspect, a server 1520 provides the speech interface 108 to clients 1505a, 1505b, and 1505c. As one example, the server 1520 is a web server providing one or more of a speech interface 1552, which may be similar to the speech interface 108; a speech-recognition system 1554, which may be similar to the speech-recognition system 110; and a text-to-speech system 1556, which may be similar to the text-to-speech system 112, over the web. The server 1520 provides one or more of the speech interface 1552, the speech-recognition system 1554, and the text-to-speech system 1556 over the web to clients 1505 through a network 1540. By way of example, the client computing device is implemented and embodied in a personal computer 1505a, a tablet computing device 1505b, or a mobile computing device 1505c (e.g., a smart phone), or other computing device. Any of these examples of the client computing device are operable to obtain content from the store 1516.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A text-to-speech learning system, the system comprising:
   at least one processor; and
   at least one storage device, operatively connected to the at least one processor and storing:

at least one training corpus comprising a plurality of
training pairs that represent a varied vocabulary from
one or more speakers, each training pair comprising a
speech input and a text input corresponding to the
speech input; and
instructions that, when executed by the at least processor,
cause the at least one processor to perform a method for
generating a pronunciation sequence conversion
model, the method comprising:
for each training pair:
selecting a training pair from the at least one training
corpus;
generating a first pronunciation sequence from the
speech input of the training pair; and
generating a second pronunciation sequence from
the text input of the training pair;
determining a pronunciation sequence difference
between the first pronunciation sequence and the
second pronunciation sequence; and
generating a pronunciation sequence conversion model
based on a plurality of pronunciation sequence differences, wherein the pronunciation sequence conversion model is configured to synthesize speech by
converting a pronunciation sequence generated in
response to a received speech input to a target
pronunciation sequence that more closely matches a
pronunciation sequence extracted from the received
speech input.

2. The text-to-speech learning system of claim 1, wherein the method further comprises extracting an audio signal vector from the speech input of the training pair, and wherein the first pronunciation sequence is generated based on the extracted audio signal vector.

3. The text-to-speech learning system of claim 1, wherein the pronunciation sequence conversion model comprises a recursive neural network.

4. The text-to-speech learning system of claim 1, wherein determining a pronunciation sequence difference between the first pronunciation sequence and the second pronunciation sequence comprises aligning the first pronunciation sequence with the second pronunciation sequence.

5. The text-to-speech learning system of claim 1, wherein the first pronunciation sequence comprises a sequence of pronunciation signals.

6. The text-to-speech learning system of claim 1, wherein:
the at least one training corpus comprises a text-to-speech training corpus comprising training pairs from a particular speaker and a speech-recognition training corpus comprising training pairs from different speakers; and
the plurality of pronunciation sequence differences comprises at least one pronunciation sequence difference generated from a training pair selected from the text-to-speech training corpus and at least one pronunciation sequence difference generated from a training pair selected from the speech-recognition training corpus.

7. The text-to-speech learning system of claim 1, wherein a pronunciation sequence generator model is configured to be used by a text-to-speech system to synthesize speech.

8. A speech recognition learning system, the system comprising:
at least one processor; and
at least one storage device, operatively connected to the at least one processor and storing:
at least one training corpus comprising a plurality of training pairs that represent a varied vocabulary from one or more speakers, each training pair comprising a speech input and a text input corresponding to the speech input; and
instructions that, when executed by the at least processor,
cause the at least one processor to perform a method for
generating a pronunciation sequence conversion
model, the method comprising:
for each training pair,
receiving a training pair from the at least one training
corpus;
extracting an audio signal vector from the speech
input of the training pair; and
applying an audio signal conversion model to the
audio signal vector to generate a converted audio
signal vector; and
adapting an acoustic model based on a plurality of
converted audio signal vectors to generate an
adapted acoustic model, wherein the adapted acoustic model is used to generate a pronunciation
sequence during a speech recognition operation.

9. The speech recognition learning system of claim 8, wherein the adapted acoustic model is configured to be used by a speech-recognition system to recognize speech from a user.

10. The speech recognition learning system of claim 8, wherein the method further comprises generating an audio vector conversion model based on the plurality of training pairs.

11. The speech recognition learning system of claim 10, wherein the method further comprises comparing an audio signal vector extracted from a speech input of a respective training pair of the plurality of training pairs to a second audio signal vector generated from the text input of the respective training pair.

12. The speech recognition learning system of claim 11, wherein the method further comprises determining a difference between the extracted audio signal vector and the second audio signal vector.

13. The speech recognition learning system of claim 12, wherein determining the difference between the extracted audio signal vector and the second audio signal vector comprises aligning the extracted audio signal vector with the second audio signal vector.

14. The speech recognition learning system of claim 11, wherein the second audio signal vector is generated by extracting an audio signal vector from synthesized speech based on the text input of the respective training pair.

15. The speech recognition learning system of claim 10, wherein the audio signal vector conversion model is configured to be used by a speech recognition system to recognize speech from a user.

16. The speech recognition learning system of claim 8, wherein the adapted acoustic model is generated by adapting a plurality of extracted audio signal vectors from a plurality of speech inputs.

17. The speech recognition learning system of claim 16, wherein:
the at least one training corpus comprises a text-to-speech training corpus comprising training pairs from a particular speaker and a speech-recognition training corpus comprising training pairs from different speakers; and
the plurality of speech inputs comprise at least one speech input from a training pair in the text-to-speech training corpus and at least one speech input from a training pair in the speech-recognition training corpus.

18. A method for generating a text-to-speech model and a speech-recognition model, the method comprising:
   generating a pronunciation sequence conversion model based on a plurality of pronunciation sequence differences, wherein each of the pronunciation sequence differences is associated with a training pair from a plurality of training pairs stored in at least one training corpus and representing a varied vocabulary from one or more speakers, and each of the pronunciation sequence differences is generated by comparing a first pronunciation sequence generated from a speech input of a training pair associated with the pronunciation sequence difference to a second pronunciation sequence generated from a text input of the training pair associated with the pronunciation sequence difference; and
   adapting an acoustic model based on a plurality of converted audio signal vectors, wherein each of the converted audio signal vectors is associated with a speech input from a plurality of speech inputs and the each of the converted audio signal vectors is generated by extracting an audio signal vector from the speech input associated with the converted audio signal vector and applying an audio signal vector conversion model to the extracted audio signal vector.

19. The method of claim 18 further comprising:
generating an audio vector conversion model based on a plurality of audio signal vector differences, wherein each of the audio signal vectors is associated with a training pair from the plurality of training pairs and each of the audio signal vector differences is generated by comparing an audio signal vector extracted from the speech input of the training pair associated with the audio signal vector difference and a second audio signal vector generated from the text input of the training pair associated with the audio signal vector difference.

* * * * *